(12) United States Patent
Petrack

(10) Patent No.: US 10,057,230 B2
(45) Date of Patent: Aug. 21, 2018

(54) CLIENT CONFIRMATION METHOD AND SYSTEM

(71) Applicant: Microsoft Technology Licensing, LLC, Redmond, WA (US)

(72) Inventor: Scott Petrack, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/849,124

(22) Filed: Sep. 9, 2015

(65) Prior Publication Data
US 2017/0012955 A1    Jan. 12, 2017

(30) Foreign Application Priority Data

Jul. 9, 2015 (GB) .................................. 1512043.9

(51) Int. Cl.
*H04L 29/06* (2006.01)
*H04L 29/08* (2006.01)
*H04L 12/741* (2013.01)

(52) U.S. Cl.
CPC ............. *H04L 63/08* (2013.01); *H04L 45/74* (2013.01); *H04L 67/02* (2013.01); *H04L 67/025* (2013.01); *H04L 67/2819* (2013.01); *H04L 67/42* (2013.01); *H04L 67/104* (2013.01); *H04L 67/26* (2013.01)

(58) Field of Classification Search
CPC ....... H04L 63/08; H04L 67/02; H04L 67/104; H04L 67/2819; H04L 45/74
See application file for complete search history.

(56) References Cited

U.S. PATENT DOCUMENTS

| | | | |
|---|---|---|---|
| 6,377,993 B1 * | 4/2002 | Brandt | G06F 11/0709 707/E17.107 |
| 6,782,080 B2 | 8/2004 | Leivo et al. | |
| 6,938,160 B2 | 8/2005 | Oono | |

(Continued)

FOREIGN PATENT DOCUMENTS

| | | |
|---|---|---|
| WO | 2013121208 A1 | 8/2013 |
| WO | WO-2015097551 | 7/2015 |

OTHER PUBLICATIONS

"International Search Report and Written Opinion", Application No. PCT/US2016/041413, dated Sep. 5, 2016, 11 pages.

(Continued)

*Primary Examiner* — Joseph P Hirl
*Assistant Examiner* — Thomas Gyorfi
(74) *Attorney, Agent, or Firm* — Schwegman Lundberg & Woessner, P.A.

(57) ABSTRACT

A client confirmation method and system for identifying data traffic transmitted over a network controlled by an operator, the data traffic being associated with at least one client, the client confirmation system comprising: a client confirmation application configured to identify at least one client address; an authenticator configured to authenticate the at least one client identified by the at least one client address by analyzing data usage information generated by the at least one client, wherein the data usage information is further known to the operator; and a traffic associator configured to associate data traffic transmitted over the network with the at least one client identified by the at least one client address.

18 Claims, 7 Drawing Sheets

(56) References Cited

U.S. PATENT DOCUMENTS

| | | | |
|---|---|---|---|
| 7,142,840 B1 | 11/2006 | Geddes et al. | |
| 7,624,184 B1* | 11/2009 | Aviani | H04L 67/2819 |
| | | | 709/212 |
| 7,697,920 B1 | 4/2010 | McClain | |
| 7,701,870 B2 | 4/2010 | Bhatia et al. | |
| 8,170,185 B2 | 5/2012 | Kult | |
| 8,281,382 B1* | 10/2012 | Sanyal | H04L 67/22 |
| | | | 705/54 |
| 8,601,146 B2 | 12/2013 | Pascual Avila et al. | |
| 8,606,704 B2 | 12/2013 | Roberts | |
| 8,621,582 B2 | 12/2013 | Boman et al. | |
| 2004/0127277 A1* | 7/2004 | Walker | G07F 17/32 |
| | | | 463/16 |
| 2005/0071276 A1* | 3/2005 | Bruchlos | G06Q 30/00 |
| | | | 705/51 |
| 2006/0046689 A1* | 3/2006 | Kim | H04L 63/08 |
| | | | 455/406 |
| 2006/0256816 A1 | 11/2006 | Yarlagadda et al. | |
| 2007/0189300 A1 | 8/2007 | Bellora et al. | |
| 2008/0159175 A1* | 7/2008 | Flack | H04L 41/0806 |
| | | | 370/257 |
| 2010/0188975 A1* | 7/2010 | Raleigh | G06Q 10/06375 |
| | | | 370/230.1 |
| 2010/0190469 A1 | 7/2010 | Vanderveen et al. | |
| 2011/0167482 A1 | 7/2011 | Touve et al. | |
| 2012/0209990 A1 | 8/2012 | Honore | |
| 2012/0220261 A1 | 8/2012 | Grefen et al. | |
| 2013/0132573 A1 | 5/2013 | Lindblom | |
| 2013/0304616 A1 | 11/2013 | Raleigh | |
| 2014/0040975 A1 | 2/2014 | Raleigh et al. | |
| 2014/0189808 A1 | 7/2014 | Mahaffey et al. | |
| 2014/0358989 A1* | 12/2014 | Xia | H04L 67/303 |
| | | | 709/203 |
| 2016/0234284 A1* | 8/2016 | Bao | H04L 67/02 |

OTHER PUBLICATIONS

Misbahuddin, et al., "A User Friendly Password Authenticated Key Agreement for Multi Server Environment", In Proceedings of the International Conference on Advances in Computing, Communication and Control, Jan. 23, 2009, pp. 113-119.

Orihara, et al., "Certificate-less User Authentication with Consent", In Proceedings of the ACM workshop on Digital identity management, Nov. 2, 2007, pp. 11-16.

"International Preliminary Report on Patentability", Application No. PCT/US2016/041413, dated Jun. 6, 2017, 6 pages.

* cited by examiner

CLIENT CONFIRMATION METHOD AND SYSTEM

RELATED APPLICATION

This application claims priority under 35 USC 119 or 365 to Great Britain Application No. 1512043.9 filed Jul. 9, 2015, the disclosure of which is incorporated by reference in its entirety.

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Nor is the claimed subject matter limited to implementations that solve any or all of the disadvantages noted in the background section.

Embodiments of the present disclosure relate to apparatus and methods for operating a rating service for identifying the source of data and furthermore operating a client confirmation service as part of the rating service. Specifically the apparatus and methods are for operating a rating service for skype clients. For example a data carrier may have a relationship with a skype client enabling a user operating such a client to transmit and receive data as part of a data bundle (in other words provide a zero rating) or to be able to charge for such data at a specific rate (in other words provide a non-zero rating).

As such the concept as discussed herein may be used to determine and flag fraudulent use of the network and in a manner that uses the communications network over which the client is operating.

According to first aspect of the present disclosure there is provided a client confirmation system for identifying data traffic transmitted over a network controlled by an operator, the data traffic being associated with at least one client, the client confirmation system comprising: a client confirmation application configured to identify at least one client address; an authenticator configured to authenticate the at least one client identified by the at least one client address by analysing data usage information generated by the at least one client, wherein the data usage information is further known to the operator; and a traffic associator configured to associate data traffic transmitted over the network with the at least one client identified by the at least one client address.

According to another aspect of the present disclosure there is provided a method for identifying data traffic transmitted over a network controlled by an operator, the data traffic being associated with at least one client, the method comprising: identifying at least one client address; authenticating the at least one client identified by the at least one client address by analysing data usage information generated by the at least one client, wherein the data usage information is further known to the operator; and associating data traffic transmitted over the network with the at least one client identified by the at least one client address According to another aspect of the present disclosure there is provided a computer program product, the computer program product being embodied on a non-transient computer-readable medium and configured so as when executed on a processor of a user device within a communications architecture, to: identify at least one client address; authenticate the at least one client identified by the at least one client address by analysing data usage information generated by the at least one client, wherein the data usage information is further known to the operator; and associate data traffic transmitted over the network with the at least one client identified by the at least one client address.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
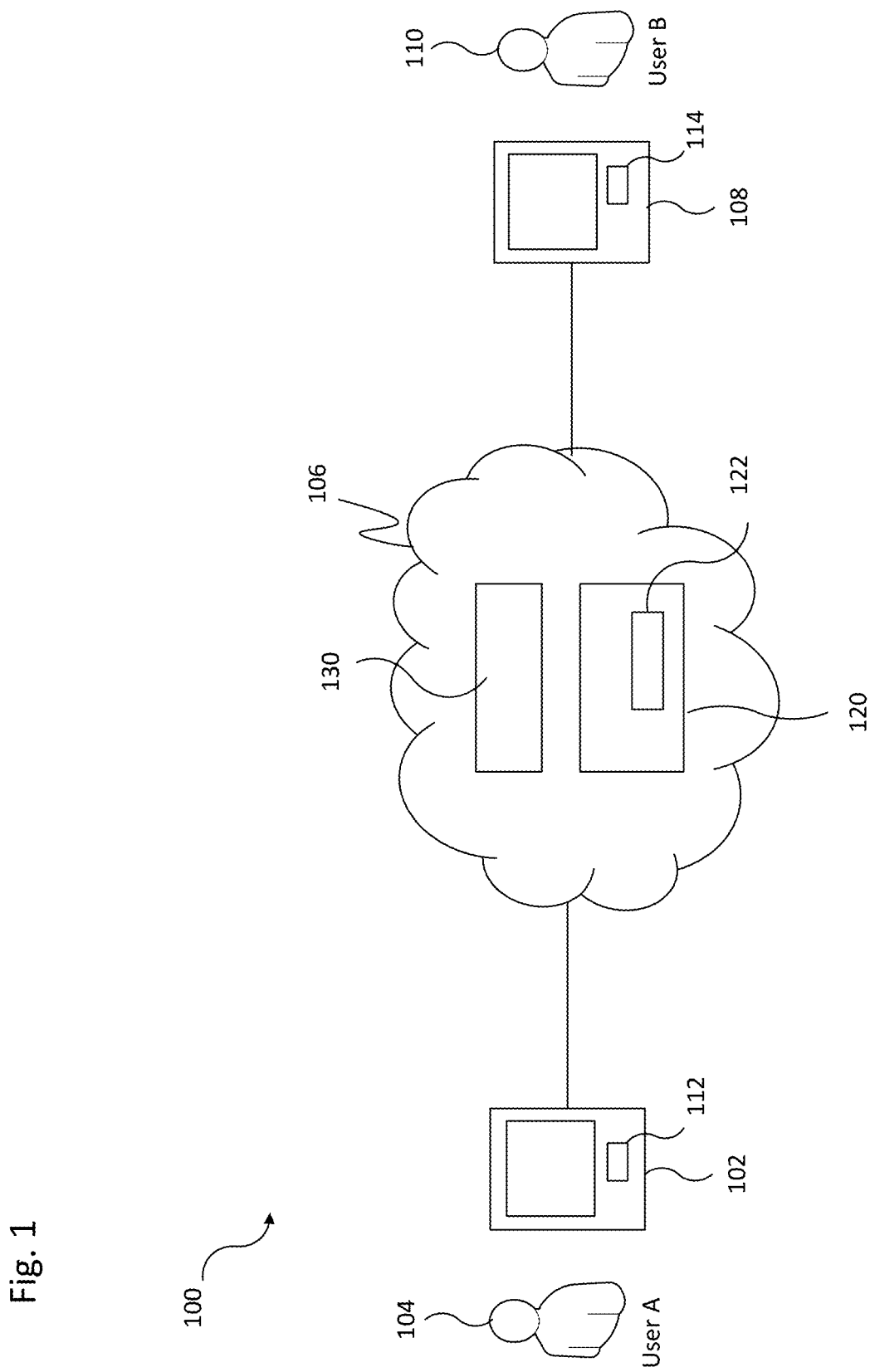
FIG. 1 shows a schematic view of a communication system.

FIG. 1 shows a communication system 100 comprising a first user 104 (User A) who is associated with a user terminal or device 102 and a second user 110 (User B) who is associated with a second user terminal or device 108. The user devices 102 and 108 can communicate over a communication network 106 in the communication system 100, thereby allowing the users 104 and 110 to communicate with each other over the communication network 106. The communication network 106 may be any suitable network which has the ability to provide a communication channel between the user device 102 and the second user device 108. For example, the communication network 106 may be the Internet or another type of network such as a high data rate cellular or mobile network, such as a $3^{rd}$ generation ("3G") mobile network.

Note that in alternative embodiments, user devices can connect to the communication network 106 via an additional intermediate network not shown in FIG. 1. For example, if the user device 102 is a mobile device, then it can connect to the communication network 106 via a cellular or mobile network (not shown in FIG. 1), for example a GSM, UMTS, 4G or the like network.

The user devices 102 and 104 may be any suitable device and may for example, be a mobile phone, a personal digital assistant ("PDA"), a personal computer ("PC") (including, for example, Windows™, Mac OS™ and Linux™ PCs), a tablet computer, a gaming device, a wearable device or other embedded device able to connect to the communication network 106. The wearable device may comprise a wearable headset.

It should be appreciated that one or more of the user devices may be provided by a single device. One or more of the user devices may be provided by two or more devices which cooperate to provide the user device or terminal.

The user device 102 is arranged to receive information from and output information to User A 104.

The user device 102 executes a communication client application 112, provided by a software provider associated with the communication system 100. The communication client application 112 is a software program executed on a local processor in the user device 102. The communication client application 112 performs the processing required at the user device 102 in order for the user device 102 to transmit and receive data over the communication system 100. The communication client application 112 executed at the user device 102 may be authenticated to communicate over the communication system through the presentation of digital certificates (e.g. to prove that user 104 is a genuine subscriber of the communication system—described in more detail in WO 2005/009019).

The second user device 108 may be the same or different to the user device 102. The second user device 108 executes, on a local processor, a communication client application 114 which corresponds to the communication client application 112 executed at the user terminal 102. The communication client application 114 at the second user device 108 performs the processing required to allow User B 110 to communicate over the network 106 in the same way that the communication client application 112 at the user device 102 performs the processing required to allow the User A 104 to communicate over the network 106. The user devices 102 and 108 are end points in the communication system. FIG. 1 shows only two users (104 and 110) and two user devices (102 and 108) for clarity, but many more users and user devices may be included in the communication system 100, and may communicate over the communication system 100 using respective communication clients executed on the respective user devices, as is known in the art.

The network 106 is shown for simplicity as being a single homogeneous network. It is understood that the network may be formed of many different networks and/or types of networks. At least part of the network may be operated or maintained by a carrier. The carrier may attempt to regulate the use of the network to optimise data flow and prevent undue congestion on the network. Part of regulation of the network may be the rating of data being passed though the network such that the data being transmitted through the network may be treated according to some defined quality of service parameter. However by rating different types of data traffic differently there is the potential of fraudulent exploitation where some data is passed off as being associated with a client or being another data type which is treated in a better manner. For example the data may be passed off as coming from a client associated with a 'zero-rated' data type (in other words 'free' data).

Within the network 106 is shown an example client confirmation server 120. The client confirmation server 120 may be configured to determine or provide information to the network operator to determine whether the data associated with a specific client operating on a user device is authentic. In other words the client confirmation server 120 may be configured to provide information which may be used by the network operator to confirm whether or not the user device is being operated correctly or whether the user device is attempting to pass off data from one client (or client type) as being data from a different client (or client type).

This information may in some embodiments be generated by the communication client application and sent and stored at the client confirmation server 120. This information may furthermore may in some embodiments be provided in response to a request from a requesting client employed by the operator or may be forwarded to a client employed by the operator directly.

In some embodiments the requesting client may furthermore trigger the transfer of the information from the communication client application. To identify the client, the client confirmation server 120 may be configured to receive from a requesting client, a request to identify the client operating on a user device (such as user device 102, or further user device 108). Furthermore the client confirmation server 120 may be configured to determine whether a client operating on the user device 102, or further user device 108 is specifically a Skype communication client.

The information generated by the client confirmation server 120 back to the requesting client may comprise a response confirming that the client is authentic. However in some embodiments the information may comprise further information enabling the requesting client to further identify that the user device operating the (skype) client is the authentic client rather than a user device implementing a 3rd party client and transmitting other data as the (zero) rated data.

The client confirmation server 120 may thus implement a response system whose purpose is to enable properly authorised queries to receive confirmation in (near) real time that there is a properly authenticated Skype user online operating a bone fide Skype client which is running on the network associated to the authentication or authorisation credentials of the query, at the internet protocol (IP) address which is submitted within the query. The query may comprise an IP address which is an internal IP address. The internal IP address may be the IP address of the user device according to the network on which the user device is registered. This internal IP address may not necessarily be publicly routable IP address, but is the one which the IP stack of the client is configured with. However the internal IP address may be guaranteed to be unique only within the context of the network on which the client is registered on.

In the embodiments shown herein the requesting client 130 is shown as being within the network 106. However the requesting client 130 may be implemented outside of the network 106. The requesting client may be implemented as software operated by the carrier partner and generate client requests which may be authorised via a 2 sided mutual transport layer security (MTLS) protocol to provide encrypted communications and end point authentication between the requesting client 130 and the client confirmation server 120. In the embodiments shown herein the client request certificate may be signed by a Microsoft certificate authority and identify the particular network from which the query is sent.

Although it may be thought that the network operator may send the query to the client directly (and without interacting with a client confirmation server) this may not be possible. For example where the client being interrogated is configured to not service any queries other than from a client confirmation server in order to prevent the passing of client sensitive information to devices and servers outside of the 'client' network.

However as described herein in further detail as the client confirmation server is configured to receive and process queries passed from the network operator within the client network such information may be 'retained' within the client network.

The client confirmation server 120 may for example be configured to enable a query to be routed to the correct client which may service the request and return a response. The response may be forwarded then to the carrier or network operator. Where all security checks complete successfully the success response may imply that the IP address on the network (with the network name in the certificate presented in the query) appears to be running a (Skype) client for a properly logged in (Skype) user.

Figure 2:
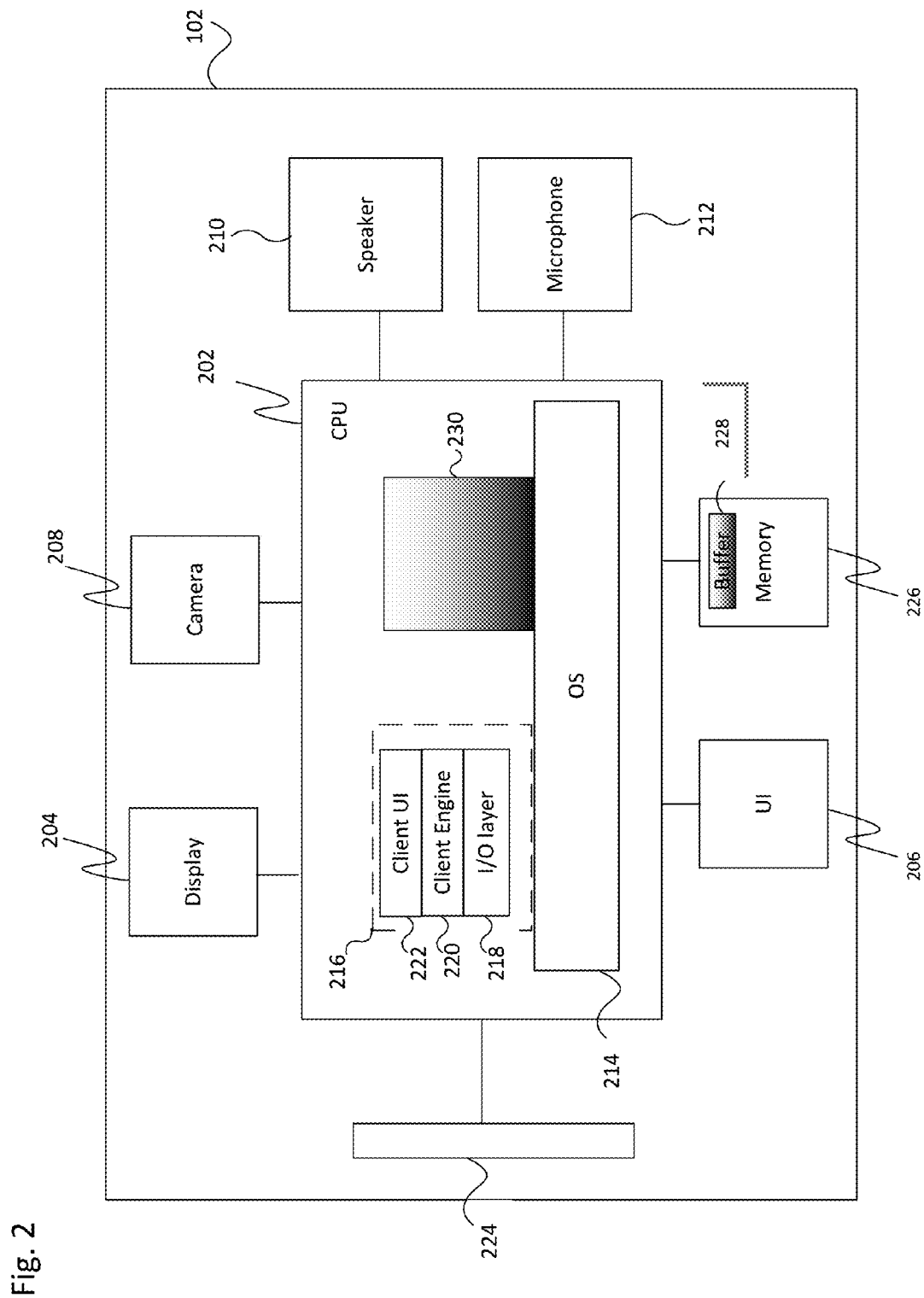
FIG. 2 shows a schematic view of a user device.

FIG. 2 illustrates a schematic view of the user device 102 on which is executed a communication client application for communicating over the communication system 100 and a client security application 230 for responding to a client confirmation security request and/or for passing information to a suitable client confirmation server. The user device 102 comprises a central processing unit ("CPU") 202, to which is connected a display 204 such as a screen or touch screen, input devices such as a user interface 206 (for example a keypad), a camera 208, and touch screen 204.

In some embodiments the user interface 206 may be a keypad, keyboard, mouse, pointing device, touchpad or similar. However the user interface 206 may be any suitable user interface input device, for example gesture or motion control user input, head-tracking or eye-tracking user input. Furthermore the user interface 206 in some embodiments may be a 'touch' or 'proximity' detecting input configured to determine the proximity of the user to a display 204.

In embodiments described below the camera 208 may be a conventional webcam that is integrated into the user device 102, or coupled to the user device via a wired or wireless connection. Alternatively, the camera 208 may be a depth-aware camera such as a time of flight or structured light camera. Furthermore the camera 208 may comprise multiple image capturing elements. The image capturing elements may be located at different positions or directed with differing points or view such that images from each of the image capturing elements may be processed or combined. For example the image capturing elements images may be compared in order to determine depth or object distance from the images based on the parallax errors. Furthermore in some examples the images may be combined to produce an image with a greater resolution or greater angle of view than would be possible from a single image capturing element image.

An output audio device 210 (e.g. a speaker, speakers, headphones, earpieces) and an input audio device 212 (e.g. a microphone, or microphones) are connected to the CPU 202. The display 204, user interface 206, camera 208, output audio device 210 and input audio device 212 may be integrated into the user device 102 as shown in FIG. 2. In alternative user devices one or more of the display 204, the user interface 206, the camera 208, the output audio device 210 and the input audio device 212 may not be integrated into the user device 102 and may be connected to the CPU 202 via respective interfaces. One example of such an interface is a USB interface.

The CPU 202 is connected to a network interface 224 such as a modem for communication with the communication network 106. The network interface 224 may be integrated into the user device 102 as shown in FIG. 2. In alternative user devices the network interface 224 is not integrated into the user device 102. The user device 102 also comprises a memory 226 for storing data as is known in the art. The memory 226 may be a permanent memory, such as ROM. The memory 226 may alternatively be a temporary memory, such as RAM.

The user device 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user devices of the communication system 100. The client engine layer 220 handles the connection management functions of the VoIP system as discussed above, such as establishing calls or other connections by server-based or peer to peer (P2P) address look-up and authentication. The client engine may also be responsible for other secondary functions not discussed herein. The client engine 220 also communicates with the client user interface layer 222. The client engine 220 may be arranged to control the client user interface layer 222 to present information to the user of the user device 102 via the user interface of the communication client application 112 which is displayed on the display 204 and to receive information from the user of the user device 102 via the user interface.

Also running on top of the OS 214 are further applications such as the client security application 230 for responding to a client confirmation security request. Embodiments are described below with reference to the further applications and communication client application 112 being separate applications, however the functionality of the further applications described in more detail below can be incorporated into the communication client application 112.

Figure 3:
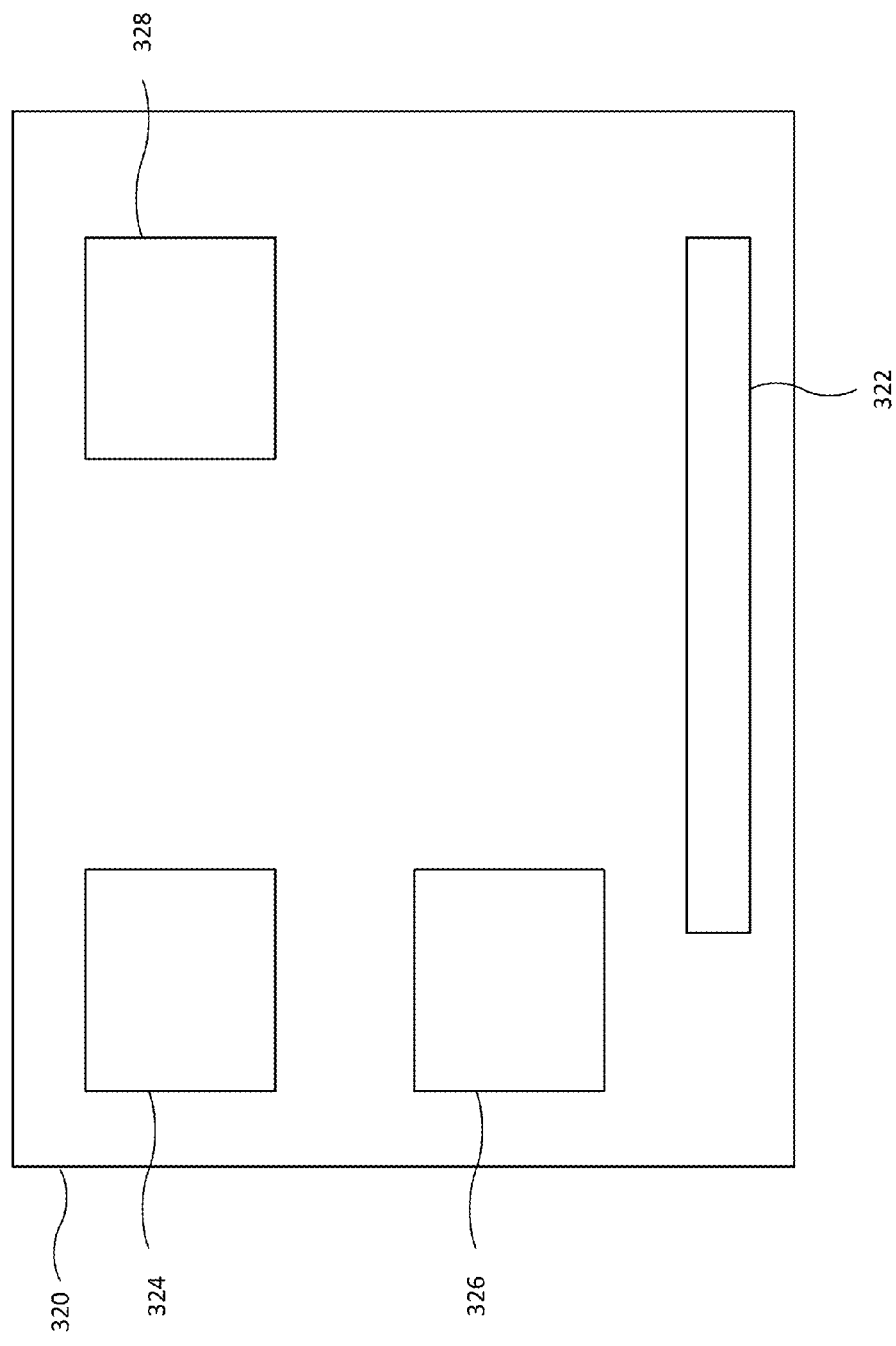
FIG. 3 shows a schematic view of a client confirmation server suitable for receiving a client confirmation request and returning information which may be used to identify the client type being implemented.

With respect to FIG. 3 a schematic view of a client confirmation server 320 and example functional applications operating within the client confirmation server 320 are shown in further detail.

In a manner similar to that shown in FIG. 2 the client confirmation server 320 on which is executed various applications or services for performing the embodiments as described herein such as providing configuration data for 'rated clients' to the user devices. The client confirmation server 320 may comprise a central processing unit ("CPU").

The CPU may be connected to a network interface such as a modem for communication with the communication network. The network interface may be integrated into the client confirmation server 320. In alternative client confirmation server configurations the network interface is not integrated into the client confirmation server. The client confirmation server 320 also comprises a memory for storing data as is known in the art. The memory may be a permanent memory, such as ROM. The memory may alternatively be a temporary memory, such as RAM.

The client confirmation server 310 is installed with the client confirmation application 322, in that the client confirmation application 322 is stored in the memory and arranged for execution on the CPU 202. An operating system ("OS") may also be executed on the CPU. Running on top of the OS is a software stack for the client confirmation application 322 referred to above.

In the following example the client confirmation server (CCS) or skype client confirmation server (SCCS) 320 comprises applications or services such as a (Skype) client confirmation application (CCA or SCCA) 322, a (Skype) rating configuration application (RCA or SRCA) 326, a (Skype) client registration application (CRA or SCRA) 324, and a traffic routing application 328.

Although in the following examples all of the applications/services are implemented on a single server apparatus it is understood that any of these applications may be implemented within separate server apparatus or operating as virtual machines running on the same server apparatus.

The operation of these applications are described in further detail with respect to FIGS. 4 to 7.

Figure 4:
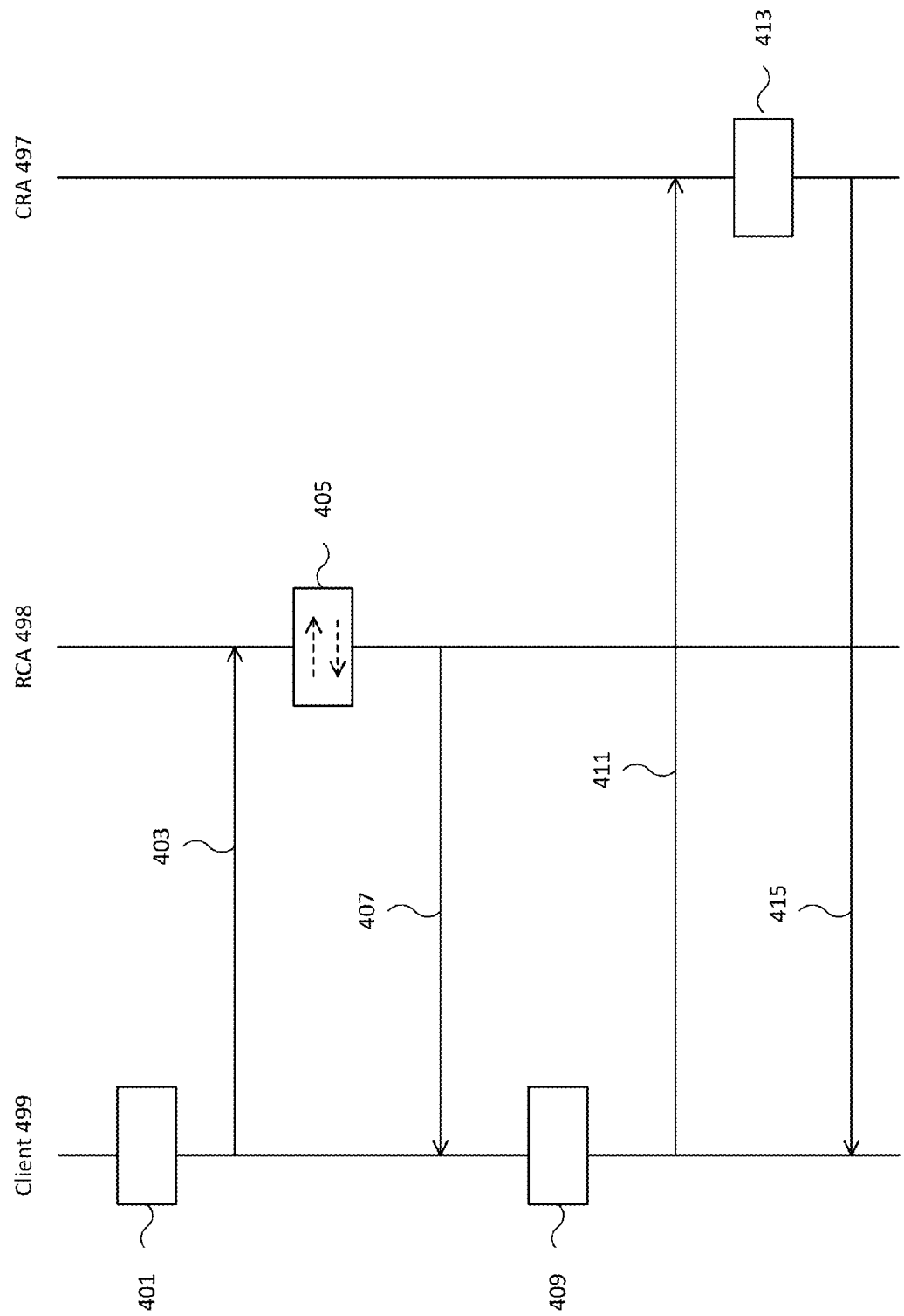
FIG. 4 shows schematic example operations and communications demonstrating an example configuration and registration of a (skype) client with regards to a client confirmation service.
Figure 5:
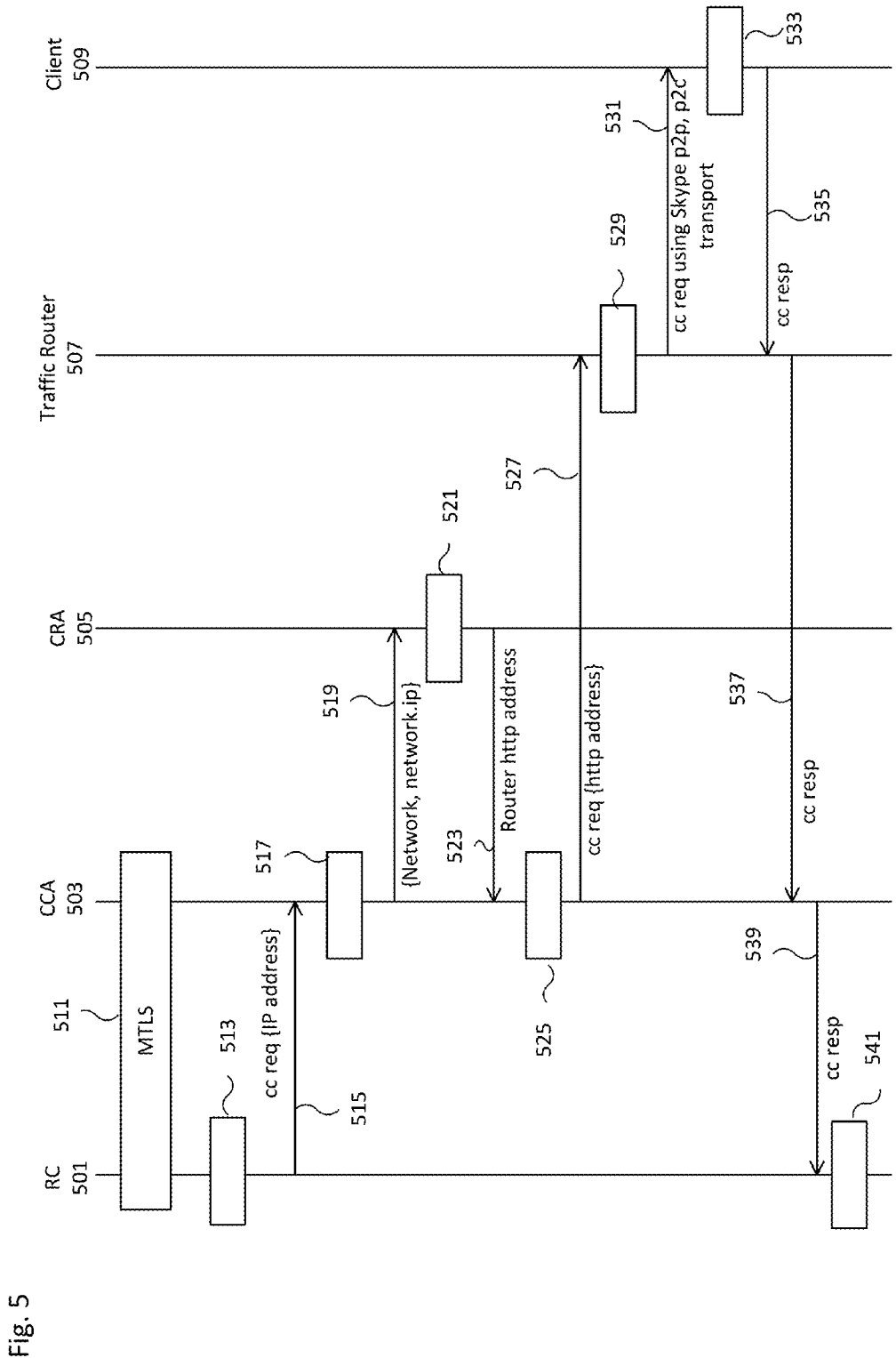
FIG. 5 shows schematic example operations and communications demonstrating a first example client confirmation service.

With respect to FIGS. 4 and 5 an example traffic confirmation procedure is shown. The example procedure or operation involves the client confirmation server being configured to receive a request from a requesting client. Furthermore the client confirmation server may process the request to identify the client based on an internet address and port identification (or just a port identification). Having identified the client the request may be forwarded to the client in order to enable the client to provide information to the requesting client via the client confirmation server. Thus information may then be employed by the requesting client to confirm the data transmitted and received to the user device by the client is authentic and has not been interfered with in some manner.

With respect to FIG. 4 an example configuration and registration of a user device implementing a rating enabled client is described in further detail. In the following examples the client is a client 499 (or skype client) operating on a user device, such as the user device 102 or further user device 108. Furthermore the data rating in the following examples is a zero rating for the data generated/received by the skype client over the network.

The client 499 may be configured to implement or instigate a zero rating configuration and registration operation.

For example the user device 102 may receive a user input for registering the client 499 such that it may use the client service on a specific carrier as part of an inclusive bundle. The client 499 may thus be configured to generate a rating configuration request message.

The rating configuration is part of the client confirmation service which the client may activate immediately upon learning that it is to configure itself to enable the carrier to (zero-) rate traffic from the client. One of the zero rated configuration parameters required by the client is the "network-name", which is precisely the same CNAME which appears in the certificate given to the Zero Rating Carrier Partner (ZRCP) or carrier to be used to authorize subsequent requests from the ZRCP.

The operation of initiating the rating enabled client 499 and thus generating a rating configuration request message is shown in FIG. 4 by step 401.

The client 499 may then transmit the rating configuration request to the rating configuration application (RCA) 498. The operation of transmitting the configuration request to the RCA is shown in FIG. 4 by step 403.

The rating configuration application (RCA) 498 may then perform the zero rating configuration operation such as generating a suitable internet protocol (IP) address to be associated uniquely (with respect to the network within which the user device is operating within) with the client.

In other words the IP address may not at all guaranteed to be globally routable or unique. This may be true if the carrier views its network as a private network and runs some Carrier-NAT solution.

For example the configuration request may be used to generate a further request for an IP address from a dynamic host configuration protocol (DHCP) server.

Furthermore the rating configuration application (RCA) 498 may be configured to generate or confirm a carrier name (or network name) configuration operation.

The RCA 498 may be configured to distribute to every client which requests configuration whilst on a network whose operator rates client traffic. The RCA 498 may perform a simple prefix/network match to determine if the skype client application is on a network of a Zero Rating Carrier Partner (ZRCP). The rating configuration causes the IP traffic produced and consumed by the client to be easily distinguished from all other traffic. Thus once identified, the traffic can be counted, monitored, separated, managed, shaped and rated. Zero-rating is one possible use of such technology.

In some embodiments the RCA 498 configuration includes setting two parameters: a local port number, which is used with all peer to peer (p2p) traffic to/from the client, and a set of destination ip-address:port pairs, which is used with all (p2c) peer-to-cloud (i.e. destined for a server) traffic from the client. All TCP and UDP p2p traffic which terminates at a rated configured client uses the local port number. Similarly, the rated configuration data contains at least one destination ip-address:port pair for each service to which the Skype client sends traffic: http, https, Griffin, and FE.

In addition, the rated configuration may further comprise setting a domain name which is the "network name" of the carrier partner which owns/maintains/manages the network from which the client sent the configuration query. This name may be used by the client as part of the Client Confirmation service (CCS) described below. In some embodiments every client that receives a configuration for zero-rating does so because the RCA 498 determines that the network it is on belongs to a carrier partner. Therefore, by definition, there will always be a network name to hand back with every rating configuration. In some embodiments a requirement of the network is that at any given moment, the pair (network name, IP-address of client} uniquely identifies a single client. For example, if a single network operator owns two disjoint networks, it might well choose to assign addresses on both networks from a single pool of numbers. If this is the case, then it is true that there are two different network names used for the two disjoint pieces. For example in some embodiments the network-name reflects the actual data and commercial hierarchy present. All the networks of a single commercial enterprise thus share a domain name suffix, and the disjoint pieces should be distinguished in the higher-level parts of their domain name.

In some embodiments the local port number is by default set to 33033.

The operation of generating a suitable IP address and network name value is shown in FIG. 4 by step 405.

This IP address value (and network value) may then be passed back to the client 499 within a configuration response message. The configuration response may further comprise other information associated with the rating of the client data.

The operation of transmitting a configuration response from the client confirmation server to the client 499 is shown in FIG. 4 by step 407.

The client 499 may then be configured to store the network name, the IP address and other configuration data.

After the client 499 receives the zero rating configuration information the client may be configured to generate a registration request comprising the data pair of the network name and the IP address and also the currently active transport router URL.

The operation of generating a registration request comprising the data pair of the network name and the IP address and also the currently active transport router URL is shown in FIG. 4 by step 409.

This registration request may then be transmitted to a client registration application (CRA) 497.

The operation of transmitting the registration request from the client 499 to the CRA 497 is shown in FIG. 4 by step 411.

The CRA 497 may then register the client 499, as being a (zero) rated client and store the currently active transport router URL, the assigned IP address of the user device (and therefore the client), and the network name. The transport router URL registered may be a full URL and not just the base URL to simplify the operation of the web server as it simply is able to retrieve what is stored and activates the URL it finds.

With respect to FIG. 5 a first example operation of a client confirmation service, and in particular the Skype client confirmation service is shown. The requesting client (RC) 501 or requesting client application may be an application operating on a carrier fraud detection server.

The requesting client 501 may be configured to implement a Mutual Transport Layer Security (MTLS) protocol process with the client conformation application (CCA) 503.

The operation of forming MTLS protocol authentication link between the requesting client 501 and the client conformation application (CCA) 503 is shown in FIG. 5 by step 511.

The requesting client 501 may then be configured to generate a suitable client confirmation request message. The client request message may for example be transmitted using the established MTLS protocol link. The client confirmation request may comprise the IP address associated with the client 509 to be investigated.

In some embodiments the (Skype) client confirmation service is a https/JSON-based query response system whose purpose is to enable properly authorized queries to receive confirmation that at the moment the query is serviced, there is a properly authenticated user online, via a bona fide (Skype) client which is running on the network associated to the authorization credentials of the query, at the IP address which is submitted within the query.

The address submitted may be an internal IP address. That is, the address submitted may be the IP address of the user device's interface according to the network on which handset sits. This may not necessarily be a publically routable IP address, but is the one which the IP stack of the client is configured with. Such an internal IP address is guaranteed to be unique only within the context of the network on which the client sits.

In some embodiments the requesting client is software operated by a carrier channel partner.

The operation of generating the client confirmation request is shown in FIG. 5 by step 513.

The RC 501 may then transmit the client confirmation request comprising the IP address to the client confirmation application (CCA) 503.

The operation of transmitting the client confirmation request is shown in FIG. 5 by step 515.

The CCA 503 may receive the client confirmation request and confirm that the request is from the network according to the MTLS protocol certificate network identifier.

In other words in some embodiments the request may be authorized via a two-sided MTLS. In such embodiments the client certificate may be signed by an MS certificate authority and it identifies the particular network from which the query is sent.

The CCA 503 may then be configured to generate a suitable traffic routing request message to be transmitted to the (Skype) client register application (CRA or SCRA) 505. The routing request message may comprise the network value and the network IP address of the client 509 being investigated.

In other words the CCS queries, with respect to a client on the Skype system, may pass from the network operator to the Skype system where properly authorized queries cause the (Skype) client confirmation service may be configured to look up within the registry the current mapping of {network, internal IP on that network} with respect to the traffic routing URL.

The operation of confirming the request is a valid request and generating a traffic routing request message is shown in FIG. 5 by step 517.

The CCA 503 may then be configured to transmit the traffic routing request message to the client register application (CRA) 505.

The operation of transmitting a traffic routing request message comprising the network and network IP address of the client is shown in FIG. 5 by step 519.

The client register application (CRA) 505 may be configured to receive the traffic routing request message from the CCA 503. The client register application (CRA) 505, which may be a Skype client register application may then be configured to take the network and the network IP address values and look these up to determine the HTTP address associated with the data traffic routing service currently serving the user device. Furthermore the client register application (SCRA) 505 may be configured to generate a traffic routing response message comprising the HTTP address.

The operation of generating the traffic routing HTTP address response message from the network and network IP address is shown in FIG. 5 by step 521.

The client register application (CRA) 505 may then be configured to transmit the traffic routing HTTP address response message back to the client confirmation application (CCA) 503.

The operation of transmitting the traffic routing HTTP address from the client register application (CRA) 505 to the client confirmation application is shown in FIG. 5 by step 523.

The client confirmation application (CCA) 503 may then receive the traffic routing HTTP address response message for the client and generate a client confirmation request to the routing HTTP address.

The client confirmation request may for example be a traffic router request which may arrive at the client from a network operator that is requesting confirmation that there is a bona fide client running at the queried internal IP address. In such examples there may be client code which copies the current connection table into a response to this query, and then the response is complete and can be returned via the traffic router.

For example, the client connection request URI may specifically request the document "client-connection/table.txt" from the client. This request may be transformed by the client confirmation service as described herein into a traffic router request for client-connection/table.txt. Furthermore the client may comprise client-side code which implements the "client-connection" module, copying the current table into an appropriate traffic router structure in the client, and then informing the Traffic router that the response is ready to be sent back to the requesting client.

In other words the client confirmation service may be configured to use the Traffic router information to send the query to the correct client.

The operation of generating the client confirmation request is shown in FIG. 5 by step 525.

The client confirmation request may then be transmitted from the client confirmation application (CCA) 503 to the traffic router 507.

The operation of transmitting the client confirmation request from the client confirmation application (CCA) 503 to the traffic router 507 is shown in FIG. 5 by step 527.

The traffic router 507 may receive the client confirmation request and forward the request to the client 509. The forwarding of the client confirmation request may be made for example by using a peer to peer (p2p) or peer to cloud (p2c) transport.

The operation of generating a suitable client confirmation request according to a suitable transport system is shown in FIG. 5 by step 529.

The operation of forwarding the client confirmation request from the traffic router 507 to the client 509 is shown in FIG. 5 by step 531.

The request in some embodiments may comprise a skype notification generation message in other words the request is to be handled by the skype application or client operating on the apparatus. In some other embodiments the request for the at least one client may comprise an operating system notification generation message. In other words the request is to be handled at the operating system level of the apparatus.

The client 509 may then be configured to receive the client confirmation request and generate a suitable client confirmation response message.

In other words the client 509 may be configured to receive the request and services it and return a response. The basic idea is simply to leverage information available in the client, such as the Skype back-end, to verify that the client is both bona fide and has the correct user logged in. The client 509 thus in some embodiments may comprise a request handler which returns values or data enabling the authentication operation to be performed.

In the following examples the client 509 is considered to both be the (origin) source and/or sink of the data and also service the request to return a response. However in some embodiments the origin of the data may be different from the request end point. For example in some embodiments the end point of the request may be a separate application and/or user device from the application and/or user device which is the origin of the data.

Thus in some embodiments the requesting client may be configured to transmit the client confirmation request to the authenticator, the "client confirmation program" running in the cloud. The response of which may be either to enable the requesting client to authenticate the at least one client, or to enable the at least one client to authenticate itself.

In other words the client confirmation request in the examples described herein ends up at the actual skype client. However in some embodiments the requesting client (i.e. the operator) queries the client confirmation program (i.e. the skype back end) about the veracity of the client (i.e. skype client) and independently of these queries, the client confirmation application (i.e. the Skype back end) may get byte-count messages from the Skype client. In these embodiments the client confirmation application returns whatever the latest byte-count received from the Skype client. Furthermore in this case, the requesting client's request does not enable or control the Skype client to do anything. In such embodiments the Skype client periodically reports its byte-counts to the Skype back-end, and the carrier gets its byte-counts from the Skype back-end. Thus in such embodiments the request handler may effectively be implemented by the client confirmation application.

In some embodiments there may not be perfect synchrony between the client confirmation requests from the carrier and any action on the part of the Skype client. This is because the Skype client might be in a call when the carrier decides it wants to send a client confirmation request, and if the client CPU is too weak, or its bandwidth is too low, it might degrade or even disrupt the call if the Skype client were to be passed the request directly.

Furthermore in some embodiments the response may contain information that the requesting client can combine with its own internally-available information to verify even more deeply the veracity of the client. In other words to determine at the client 509 information known to both the client 509 and the operator employing the requesting client or data that both the client and the operator may measure, such that the requesting client may verify the client 509.

For example a success response to a query may contain two values for further verification.

The first value may be the total byte-counts of data transmitted and received by that user device since the previous midnight (0000 UTC) or the time the client last joined the network (whichever is later).

The second value may be the timestamp of the start time for the measurement (in other words 0000 or network-join time) and the end time of the query period.

These values may then be used by the carrier or operator partner. For example the carrier may compare these two values with its own counts for data terminating on the user device. The client may thus be further confirmed as being the rated client when the byte-counts reported by the client and those seen by the carrier agree (within a tolerance dependent on the differences in clock time between the client and the carrier network).

In some embodiments the values may be a list of "flow-quintuples" that have been active since 0000 UTC or any other defined time value, such as when the client first was active when this is later than the defined time value. This defined time enables both client and operator (requesting client) to be 'clock synchronized'. The flow-quintuple may be the five elements:

(TCP or UDP, local address, local port, remote address, remote port).

These flow-quintuples may define a "Client Connection List" (CCL). In some embodiments the CCL comprises the list which is filtered according to defined client values. In some other embodiments the list comprises the values associated with the last few or couple of clients used by the client apparatus.

These values may be determined by the skype client.

A successful response to an authorized query may be a '200 OK' response. Thus '200 OK' response may be sent together with a table of information called the Client Connection list.

These "client connection list" or report values are included to preclude a sophisticated attack. For example where the client is kept running, but replaces the IP stack with one that will allow multiple processes to send data from a single port, and allows multiple processes to receive the data sent to a single port.

The operation of generating a suitable client confirmation response is shown in FIG. 5 by step 533.

The client confirmation response message may then be transmitted back to the router using the p2p or p2c transports.

The operation of transmitting the client confirmation response message back to the traffic router 507 is shown in FIG. 5 by step 535.

The client confirmation response message may then be transmitted back via the traffic router 507 to the client confirmation application 503.

The operation of forwarding the client confirmation response message from the traffic router 507 to the client confirmation application 503 is shown in FIG. 5 by step 537.

Furthermore the client confirmation response may be transmitted from the client confirmation application 503 to the requesting client 501.

The forwarding of the client confirmation response message from the client confirmation application 503 to the requesting client 501 is shown in FIG. 5 by step 539.

Finally the requesting client 501 may then receive the client confirmation response message and process the client confirmation response message in such a way that it may authenticate that the client operating on the user device is a valid client. This authentication operation may be performed by an authenticator within the requesting client.

Furthermore in some embodiments the client confirmation reapplication may comprise an authenticator and furthermore be configured to receive the operator information from the requesting client 501 and authenticate that the client operating on the user device is a valid client (and optionally pass back to the requesting client an indication that the client is a valid client or invalid client).

Thus the carrier (and the requesting client) can make a query (authorised by certificate which contains the network name) and containing the IP address of the user device and receive a response confirming whether the client is active or not.

Furthermore, as described above, in some embodiments the carrier may receive from the client confirmation service an account status report. The account status report may comprise any information which may be measured or determined by the carrier. For example the account status report may contain the total (by account) of data sent to and received from the client (for both TCP and UDP). This total may be determined since the client joined it current network, or since midnight 0000 UTC (whichever is later). As explained previously the midnight 0000 UTC value is an example only and any suitable 'clock synchronised' time value may be chosen and used by both the client and the carrier.

Similarly where the values are a list of "flow-quintuples" that have been active in the since 0000 UTC or from another fixed point then these flow-quintuple values may be compared against the flow-quintuple values known to the carrier.

This "Client Connection List", a table which contains one line for each TCP connection and UDP stream with which a client is actively exchanging traffic may thus be used to further verify the client is a valid client. For example as described herein the CCL may comprise a list which is filtered according to defined client values. In some other embodiments the list comprises the values associated with the last few or couple of clients used by the client apparatus.

In other words the carrier may then review the account status report against the values stored by the carrier to further verify that the client has not been tampered with.

In such embodiments the client confirmation service as described in the embodiments above may be able to help the carrier or operator eliminate the fraudulent usage of zero-rating of data.

Furthermore in some embodiments the requesting client or further component of the client confirmation system, such as an operator or carrier traffic associator or traffic router may be configured to associate the data traffic transmitted over the network with the at least one client identified by the at least one client address.

Similarly the requesting client or further component of the client confirmation system, such as an operator or carrier traffic rate determiner may be configured to associate the data traffic transmitted over the network according to a defined rating associated with the at least one client.

The requesting client or further component of the client confirmation system, such as an operator or carrier traffic filter may be configured to control filtering the data traffic associated with the at least one client according to a defined rating associated with the at least one client.

The approaches described herein may be seen as a framework that can be extended and augmented in various ways, to make it more difficult to produce these fraudulent streams, and to unmask the frauds faster. These include getting more information from more parts of the application, as well as getting some information from other parts of the network (for example, the social graph of the client user).

The operation of validating the client as a valid client (a client which is a rated client) is shown in FIG. 5 by step 541.

It is understood that when a carrier implements fraud detection such as described above, there is a possible 'bootstrap' issue. When the client starts up and initiates a configuration process, for example by contacting a rating configuration application or a supernode, if the carrier sends an immediate CCS query, the client might not yet have been registered. To overcome such problems the CCS (and therefore the requesting client) may be configured to add a delay of several seconds to enable a client to configure and register itself. A further possibility may be to enable at least the opening services that the client allow a zero-rating by a destination ip:port method, and not by the source/local port method described herein.

As the server based traffic is easier to secure it may, as described herein, serve as a basis for deeper checks to augment a basic client confirmation service request/response. In such examples a secure verification or client confirmation service can confirm that the termination of the traffic it plans to zero-rate is in fact a true copy of the client application. When it is determined that the termination point of that traffic is not the actual application, it is a sign that something malicious is going on.

Furthermore by identifying that the data associated with the ip:port pair (or simply port identifier) is the correct client. The carrier may then be configured to enable rating or filtering of data originating from the ip:port identifier (in other words the authorised client).

Figure 6:
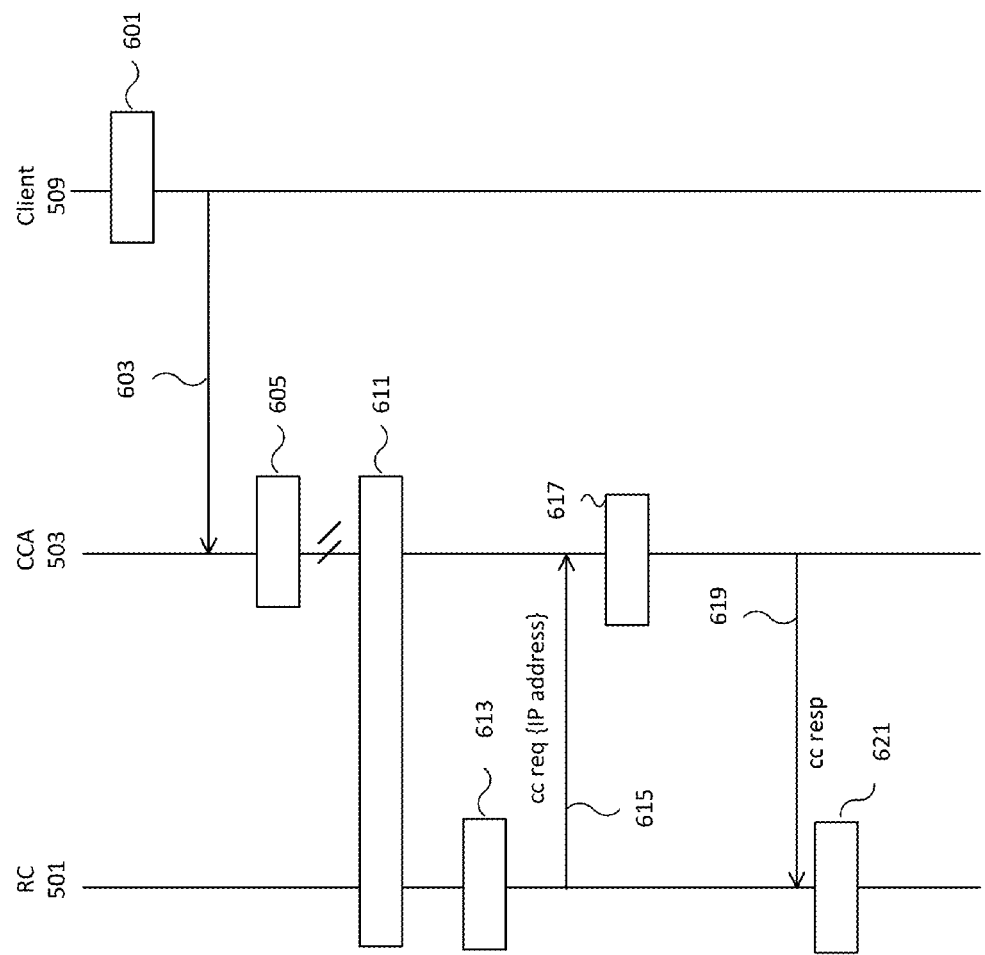
FIG. 6 shows schematic example operations and communications demonstrating a second example client confirmation service.

With respect to FIG. 6 a further example of client confirmation by data comparison is shown. In the example shown in FIG. 6 the Client 509 may be configured to push or forward data usage information which may be used by the client confirmation service 503 or the requesting client 501 to identify that a ip:port pair or a port and thus data from the ip:port or port identifier is able to reliably rated.

The first part of the operation occurs between the client 509 and the client confirmation service 503.

The client 509 may generate and transmit to the client confirmation server 503 suitable client confirmation information which may be stored at the client confirmation server 503.

In other words the client 509 may be configured to determine information available in the client, such as the Skype back-end, to verify that the client is both bona fide and has the correct user logged in and thus from the identifier enable the rating or filtering of data from the user.

This information available to the client may also be known to the requesting client such that the requesting client 501 can combine with its own internally-available information to verify the client.

For example the information may, as described earlier, contain two values for further verification. The first value may be the total byte-counts of data transmitted and received by that user device since the previous midnight (0000 UTC) or the time the client last joined the network (whichever is later). The second value may be the timestamp of the start time for the measurement (in other words 0000 or network-join time) and the end time of the query period.

Furthermore, as described previously, in some embodiments the values may be a CCL list such as the "flow-quintuples" that have been active in the past 24 hours as described herein.

These values may be determined by the skype client. As with the example shown in FIG. 5 the time-period of 24 hours is simply an example and may be any period, either a rolling period or a period determined from a fixed point (such as from 0000 UTC).

These "client connection list" or report values are included to preclude a sophisticated attack. For example where the client is kept running, but replaces the IP stack with one that will allow multiple processes to send data from a single port, and allows multiple processes to receive the data sent to a single port.

The operation of generating a suitable client confirmation message is shown in FIG. 6 by step 601.

The client confirmation message may then be transmitted to the CCA 503 using the p2p or p2c transports.

The operation of transmitting the client confirmation message to the CCA 503 is shown in FIG. 6 by step 603.

The client confirmation message may then be stored on the client confirmation application 503.

The operation of storing the client confirmation message at the client confirmation application 503 is shown in FIG. 6 by step 605.

These client confirmation messages may be generated and sent at intervals defined by the client 509 or the CCA 503. For example the messages may be generated and sent at intervals of 20 minutes such that the information stored by the CCA 503 is not more than 20 minutes out of date. In some embodiments the client confirmation messages may be generated in response to a trigger event, such as a significant change in the amount of data being transmitted, or a data transmitted amount being reached.

In some embodiments the data confirmation message is a dynamic reporting message which reports the differences in the data being monitored since the last message was transmitted. In such embodiments there may be a further acknowledgment operation wherein the CCA 503 acknowledges the receipt of the last data confirmation message such that both the client 509 and the CCA 503 are 'synchronised'.

The second part of the operation occurs between the client confirmation service 503 and the requesting client (RC) 501.

As described previously the requesting client (RC) 501 or requesting client application may be an application operating on a carrier fraud detection server or be an application for controlling the rating or filtering of data carried over the network operated by the operator.

The requesting client 501 may be configured to implement a Mutual Transport Layer Security (MTLS) protocol process with the client conformation application (CCA) 503.

The operation of forming MTLS protocol authentication link between the requesting client 501 and the client conformation application (CCA) 503 is shown in FIG. 6 by step 611.

The requesting client 501 may then be configured to generate a suitable client confirmation request message. The client request message may for example be transmitted using the established MTLS protocol link. The client confirmation request may comprise the IP address associated with the client 509 to be investigated.

As described previously the client confirmation service may be a https/JSON-based query response system whose purpose is to retrieve and forward information back to the requesting server in response to properly authorized queries.

The address submitted may be an internal IP address. That is, the address submitted may be the IP address of the user device's interface according to the network on which handset sits. This may not necessarily be a publically routable IP address, but is the one which the IP stack of the client is configured with. Such an internal IP address is guaranteed to be unique only within the context of the network on which the client sits.

The operation of generating the client confirmation request is shown in FIG. 6 by step 613.

The RC 501 may then transmit the client confirmation request comprising the IP address to the client confirmation application (CCA) 503.

The operation of transmitting the client confirmation request is shown in FIG. 6 by step 615.

The CCA 503 may receive the client confirmation request and confirm that the request is from the network according to the MTLS protocol certificate network identifier.

The CCA 503 may then be configured to determine or retrieve stored information associated with the client identified by the ip address.

In other words the CCS queries, with respect to a client on the Skype system, may pass from the network operator to the Skype system where properly authorized queries cause the CCA to look up within the memory the 'two values' for further verification or list of "flow-quintuples" that have been active in the past 24 hours.

The operation of confirming the request is a valid request and generating a response message comprising the stored information is shown in FIG. 6 by step 617.

The CCA 503 may then be configured to transmit the response to requesting client 501.

The operation of transmitting the client confirmation response message is shown in FIG. 6 by step 619.

The client confirmation request message may be received by the requesting client 501 and the values may then be used by the carrier or operator partner to confirm the client. For example the carrier may compare these two values with its own counts for data terminating on the user device. The client may thus be further confirmed as being the rated client when the byte-counts reported by the client and those seen by the carrier agree (within a tolerance dependent on the differences in clock time between the client and the carrier network).

The operation of analysing the values within the client confirmation response to confirm the client and thus enable the data from the client to be rated or filtered with a degree of certainty is shown in FIG. 6 by step 621.

Figure 7:
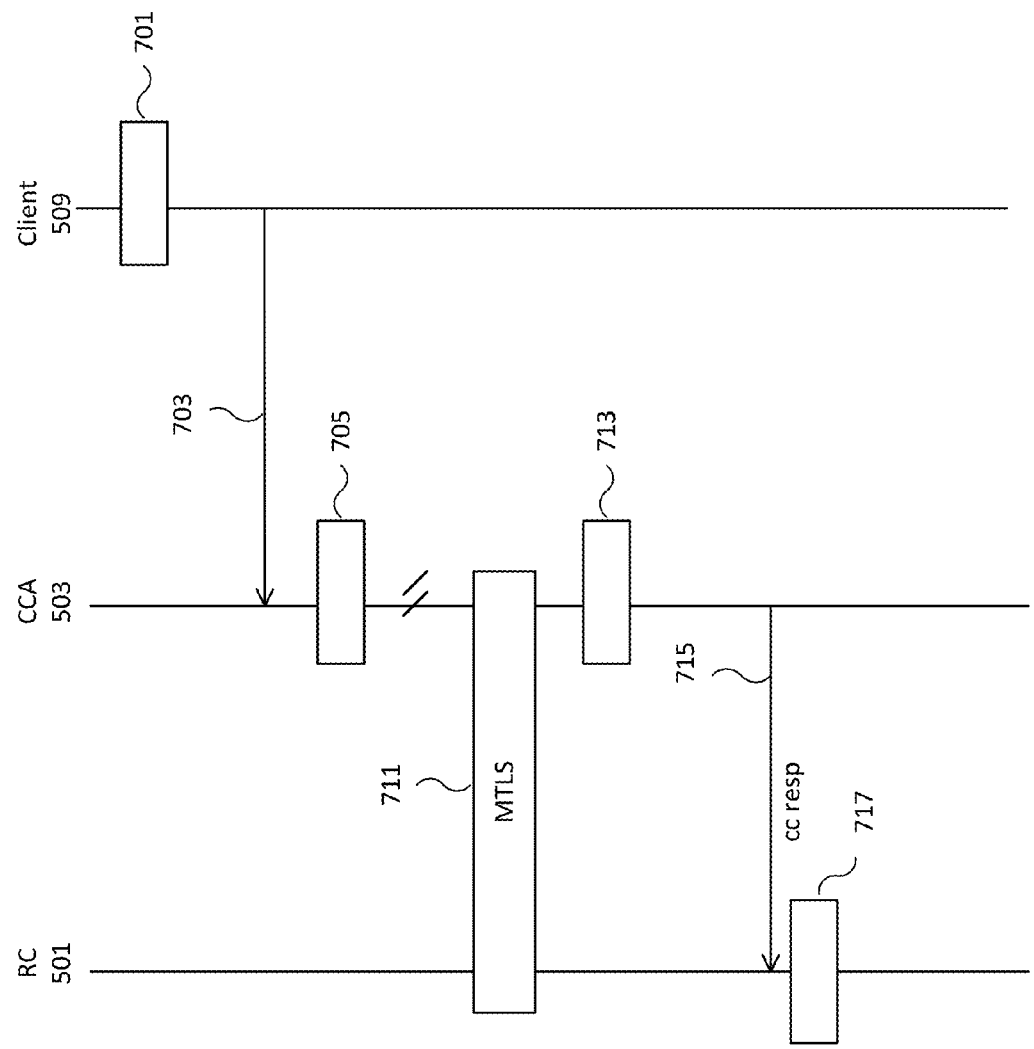
FIG. 7 shows schematic example operations and communications demonstrating a third example client confirmation service.

With respect to FIG. 7 a further example of client confirmation by data comparison is shown. In the example shown in FIG. 7 the Client 509 may be configured to push or forward data usage information which may be used by the client confirmation service 503 or the requesting client 501 to identify that a ip:port pair or a port and thus data from the ip:port or port identifier is able to reliably rated. Furthermore FIG. 7 shows an example wherein the data usage information is furthermore compiled and pushed to a requesting client.

The first part of the operation occurs between the client 509 and the client confirmation service 503 and may be similar to the operations such as shown with respect to the example in FIG. 6.

Thus the client 509 may generate and transmit to the client confirmation server 503 suitable client confirmation information which may be stored at the client confirmation server 503.

The operation of generating a suitable client confirmation message is shown in FIG. 7 by step 701.

The client confirmation message may then be transmitted to the CCA 503 using the p2p or p2c transports.

The operation of transmitting the client confirmation message to the CCA 503 is shown in FIG. 7 by step 703.

The client confirmation message may then be stored on the client confirmation application 503.

The operation of storing the client confirmation message at the client confirmation application 503 is shown in FIG. 7 by step 705.

The second part of the operation occurs between the client confirmation service 503 and the requesting client (RC) 501.

The requesting client 501 may be configured to implement a Mutual Transport Layer Security (MTLS) protocol process with the client conformation application (CCA) 503.

The operation of forming MTLS protocol authentication link between the requesting client 501 and the client conformation application (CCA) 503 is shown in FIG. 7 by step 711.

In some embodiments any suitable Internet Protocol Security (IPsec) implementation may be employed to authenticate the client and requesting client.

The CCA 503 may be configured to determine or retrieve stored information associated with a client and generate a client confirmation message comprising the retrieved information.

In other words the CCA may look up within the memory the 'two values' for further verification or list of "flow-quintuples" that have been active in the past 24 hours.

The operation of generating a client confirmation message comprising the stored information is shown in FIG. 7 by step 713.

The generation of the client confirmation message may in some embodiments be trigged by a trigger event. The trigger event may for example be a time event, for example pushing data to the requesting client 501 every 30 minutes. In some embodiments the trigger event may be a data event, for example pushing data to the requesting client when the client has reached a defined data usage.

The CCA 503 may then be configured to transmit the client confirmation message to requesting client 501.

The operation of transmitting the client confirmation message is shown in FIG. 7 by step 715.

The client confirmation request message may be received by the requesting client 501 and the values may then be used by the carrier or operator partner to confirm the client according to methods described herein.

Furthermore having determined the client, the requesting client may furthermore perform data rating or data filtering on data to and from the identified client using an identified port number.

The operation of analysing the values within the client confirmation response to confirm the client and thus enable the data from the client to be rated or filtered with a degree of certainty is shown in FIG. 7 by step 717.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

There is also provided a client confirmation system for identifying data traffic transmitted over a network controlled by an operator, the data traffic being associated with at least one client, the client confirmation server comprising: a client confirmation application configured to identify at least one client address; an authenticator configured to authenticate the at least one client identified by the at least one client address by analysing data usage information generated by the at least one client, wherein the data usage information is further known to the operator; a traffic associator configured to associate data traffic transmitted over the network with the at least one client identified by the at least one client address.

The client confirmation system may further be configured to rate the data traffic associated with the at least one client according to a defined rating associated with the at least one client.

The client confirmation system may further comprise a traffic filter configured to control filtering the data traffic associated with the at least one client according to a defined rating associated with the at least one client.

The client confirmation application configured to identify at least one client address may be further configured to determine at least one of: an internet protocol address:port number identifier where the at least one client is operating in a peer-to-client network; and a port number identifier where the at least one client is operating in a peer-to-peer network.

The client confirmation system may further comprise: a requesting client configured to generate a client confirmation request for the at least one client identified by the at least one client address; the requesting client further configured to transmit the client confirmation request to a request handler to enable the client to authenticate the at least one client.

The request for the at least one client may comprise a skype notification generation message.

The request for the at least one client may comprise an operating system notification generation message.

The client confirmation application may be configured to: receive the client confirmation request from the requesting client, the client confirmation request comprising the at least one client address; determine the requesting client is associated with a network identifier associated with the network; determine a routing address associated with a user device hosting the request handler from a combination of the network identifier and the at least one client address; communicate with the user device hosting the request handler via a traffic router using the routing address to receive a response from the user device, the response being associated with the client; transmit the client confirmation response to the requesting client comprising the authenticator for confirming the client is a valid client based on the response from the user device.

The at least one client may comprise the request handler.

The client confirmation application configured to determine the requesting client is associated with a network identifier may further be configured to determine from a mutual transport layer security protocol certificate the requesting client is associated with the network identifier.

The client confirmation application configured to determine a routing address may be configured to: generate a routing request comprising the network identifier and the client address; transmit the routing request to a client register, wherein the client register identifies from the network identifier and the client address a URI identifying the current routing address for the user device hosting the client; and receive the URI identifying the current routing address for the user device hosting the client the current routing address for the user device.

The client confirmation application configured to communicate with the user device hosting the client via the routing address may be further configured to: generate a https query for the URI identifying the current routing address for the user device hosting the client, such that the query is received and forwarded to the user device hosting the client which responds to the https query with a https response identifying the validity of the client; and receive the https response via the current routing address identifying the validity of the client.

The client confirmation response may comprise a response configured to confirm a client is a valid Skype client.

The client confirmation response may comprise the data usage information generated by the client.

The client confirmation system may further comprise a client register configured to: receive from a user device hosting the client a request for configuration information for use of the network; generate the at least one client address for the user device hosting the client; and transmit to the user device the at least one client address and the network identifier.

The client confirmation system may further comprise: receiving from the user device hosting the client a request for registration on the network, the request for registration comprising the client address for the user device hosting the client, the network identifier and a URI identifying the current routing address for the user device hosting the client; storing the client address for the user device hosting the client, the network identifier and a URI identifying the current routing address for the user device hosting the client such that user device hosting the client can be uniquely identified within the network by a combination of the network identifier and the client address and the user device may be located via the URI identifying the current routing address for the user device hosting the client.

The client confirmation application may be configured to: receive data usage information from the at least one client; store the data usage information; and transmit the data usage information to at least one authenticator within a requesting client for authenticating the at least one client.

The client confirmation application configured to transmit the data usage information to at least one requesting client for authenticating the at least one client may be configured to transmit the data usage information to at least one requesting client in response to a client confirmation request from the at least one requesting client.

The client confirmation application configured to transmit the data usage information to at least one requesting client for authenticating the at least one client may be configured to transmit the data usage information to at least one requesting client in response to determining a trigger event.

The trigger event may comprise at least one of: a time based trigger event; and a data based trigger event.

The data usage information may comprise a client connection list, the client connection list comprising data flow quintuples associated with the client of {TCP or UDP, local address, local port, remote address, remote port} from a defined time.

The data usage information may comprise a report value, the report value may comprise: byte-counts of a measured client data transmitted and received by the user device since whichever is later from the previous midnight (0000 UTC) or the time the client last joined the network; and a timestamp of the start time for the measured client data and the end time of the query period.

The authenticator configured to authenticate the at least one client, may be further configured to: determine, by the operator, data usage information associated with the client; and compare the data usage information determined by the client with the data information associated with the client to authenticate the at least one client.

There is also provided a method for identifying data traffic transmitted over a network controlled by an operator, the data traffic being associated with at least one client, the method comprising: identifying at least one client address; authenticating the at least one client identified by the at least one client address by analysing data usage information generated by the at least one client, wherein the data usage information is further known to the operator; and associating data traffic transmitted over the network with the at least one client identified by the at least one client address.

The method may further comprise rating the data traffic associated with the at least one client according to a defined rating associated with the at least one client.

The method may further comprise filtering the data traffic associated with the at least one client according to a defined rating associated with the at least one client.

Identifying at least one client address may comprise determining at least one of: an internet protocol address:port number identifier where the at least one client is operating in a peer-to-client network; and a port number identifier where the at least one client is operating in a peer-to-peer network.

The method may further comprise: generating a request for the at least one client identified by the at least one client address; and transmitting the request to a request handler to enable the client to authenticate the at least one client.

The request for the at least one client may comprise a skype notification generation message.

The request for the at least one client may comprise an operating system notification generation message.

Authenticating the at least one client may comprise: receiving a client confirmation request from a requesting client for monitoring fraudulent use of a network, the client confirmation request comprising the at least one client address; determining the requesting client is associated with a network identifier associated with the network; determining a routing address associated with a user device hosting the request handler from a combination of the network identifier and the at least one client address; communicating with the user device hosting the request handler via the routing address to receive a response from the user device, the response being associated with the client; and transmitting the client confirmation response to the requesting client for confirming the client is a valid client based on the response from the user device.

The at least one client may comprise the request handler.

Determining the requesting client is associated with a network identifier may comprise determining from a mutual transport layer security protocol certificate the requesting client is associated with the network identifier.

Determining a routing address may comprise: generating a routing request comprising the network identifier and the client address; transmitting the routing request to a client register, wherein the client register identifies from the network identifier and the client address a URI identifying the current routing address for the user device hosting the client; and receiving the URI identifying the current routing address for the user device hosting the client the current routing address for the user device.

Communicating with the user device hosting the client via the routing address may comprise: generating a https query for the URI identifying the current routing address for the user device hosting the client, such that the query is received and forwarded to the user device hosting the client which responds to the https query with a https response identifying the validity of the client; and receiving the https response via the current routing address identifying the validity of the client.

The client confirmation response may comprise a response configured to confirm a client is a valid Skype client.

The client confirmation response may comprise the data usage information generated by the client.

The method may further comprise: receiving from a user device hosting the client a request for configuration information for use of the network; generating the at least one client address for the user device hosting the client; and transmitting to the user device the at least one client address and the network identifier.

The method may further comprise: receiving from the user device hosting the client a request for registration on the network, the request for registration comprising the client address for the user device hosting the client, the network identifier and a URI identifying the current routing address for the user device hosting the client; storing the client address for the user device hosting the client, the network identifier and a URI identifying the current routing address for the user device hosting the client such that user device hosting the client can be uniquely identified within the network by a combination of the network identifier and the client address and the user device may be located via the URI identifying the current routing address for the user device hosting the client.

Authenticating the at least one client may further comprise: receiving data usage information from the at least one client; storing the data usage information; and transmitting the data usage information to at least one requesting client for authenticating the at least one client.

Transmitting the data usage information to at least one requesting client for authenticating the at least one client may comprise transmitting the data usage information to at least one requesting client in response to the client confirmation request from the at least one requesting client.

Transmitting the data usage information to at least one requesting client for authenticating the at least one client may comprise transmitting the data usage information to at least one requesting client in response to determining a trigger event.

The trigger event may comprise at least one of: a time based trigger event; and a data based trigger event.

The data usage information may comprise a client connection list, the client connection list comprising data flow quintuples associated with the client of {TCP or UDP, local address, local port, remote address, remote port} from a defined time.

The data usage information may comprise a report value, the report value comprising: byte-counts of a measured client data transmitted and received by the user device since whichever is later from the previous midnight (0000 UTC) or the time the client last joined the network; and a timestamp of the start time for the measured client data and the end time of the query period.

Authenticating the at least one client may further comprise: determining, by the operator, data usage information associated with the client; and comparing the data usage information determined by the client with the data information associated with the client to authenticate the at least one client.

There may also be provided a computer program product, the computer program product being embodied on a non-transient computer-readable medium and configured so as when executed on a processor of a user device within a communications architecture, to: identify at least one client address; authenticate the at least one client identified by the at least one client address by analysing data usage information generated by the at least one client, wherein the data usage information is further known to the operator; and associate data traffic transmitted over the network with the at least one client identified by the at least one client address.

The computer program product may be further caused to rating the data traffic associated with the at least one client according to a defined rating associated with the at least one client.

The computer program product may be further caused to filter the data traffic associated with the at least one client according to a defined rating associated with the at least one client.

Identifying at least one client address may cause the computer program product to determine at least one of: an internet protocol address:port number identifier where the at least one client is operating in a peer-to-client network; and a port number identifier where the at least one client is operating in a peer-to-peer network.

The computer program product may be further caused to: generate a request for the at least one client identified by the at least one client address; and transmit the request to a request handler to enable the client to authenticate the at least one client.

The request for the at least one client may comprise a skype notification generation message.

The request for the at least one client may comprise an operating system notification generation message.

Authenticating the at least one client may cause the computer program product to: receive a client confirmation request from a requesting client for monitoring fraudulent use of a network, the client confirmation request comprising the at least one client address; determine the requesting client is associated with a network identifier associated with the network; determine a routing address associated with a user device hosting the request handler from a combination of the network identifier and the at least one client address; communicate with the user device hosting the request handler via the routing address to receive a response from the user device, the response being associated with the client; and transmit the client confirmation response to the requesting client for confirming the client is a valid client based on the response from the user device.

The at least one client may comprise the request handler.

Determining the requesting client is associated with a network identifier may cause the computer program product to determine from a mutual transport layer security protocol certificate the requesting client is associated with the network identifier.

Determining a routing address may cause the computer program product to: generate a routing request comprising the network identifier and the client address; transmit the routing request to a client register, wherein the client register identifies from the network identifier and the client address a URI identifying the current routing address for the user device hosting the client; and receive the URI identifying the current routing address for the user device hosting the client the current routing address for the user device.

Communicating with the user device hosting the client via the routing address may cause the computer program product to: generate a https query for the URI identifying the current routing address for the user device hosting the client, such that the query is received and forwarded to the user device hosting the client which responds to the https query with a https response identifying the validity of the client; and receive the https response via the current routing address identifying the validity of the client.

The client confirmation response may comprise a response configured to confirm a client is a valid Skype client.

The client confirmation response may comprise the data usage information generated by the client.

The computer program product may be further caused to: receive from a user device hosting the client a request for configuration information for use of the network; generate the at least one client address for the user device hosting the client; and transmit to the user device the at least one client address and the network identifier.

The computer program product may be further caused to: receive from the user device hosting the client a request for registration on the network, the request for registration comprising the client address for the user device hosting the client, the network identifier and a URI identifying the current routing address for the user device hosting the client; store the client address for the user device hosting the client, the network identifier and a URI identifying the current routing address for the user device hosting the client such that user device hosting the client can be uniquely identified within the network by a combination of the network identifier and the client address and the user device may be located via the URI identifying the current routing address for the user device hosting the client.

Authenticating the at least one client may cause the computer program product to: receive data usage information from the at least one client; store the data usage information; and transmit the data usage information to at least one requesting client for authenticating the at least one client.

Transmitting the data usage information to at least one requesting client for authenticating the at least one client may cause the computer program product to transmit the data usage information to at least one requesting client in response to the client confirmation request from the at least one requesting client.

Transmitting the data usage information to at least one requesting client for authenticating the at least one client may cause the computer program product to transmit the data usage information to at least one requesting client in response to determining a trigger event.

The trigger event may comprise at least one of: a time based trigger event; and a data based trigger event.

The data usage information may comprise a client connection list, the client connection list comprising data flow quintuples associated with the client of {TCP or UDP, local address, local port, remote address, remote port} from a defined time.

The data usage information may comprise a report value, the report value comprising: byte-counts of a measured client data transmitted and received by the user device since whichever is later from the previous midnight (0000 UTC) or the time the client last joined the network; and a timestamp of the start time for the measured client data and the end time of the query period.

Authenticating the at least one client may cause the computer program product to: determine, by the operator, data usage information associated with the client; and compare the data usage information determined by the client with the data information associated with the client to authenticate the at least one client.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A client confirmation system for identifying data traffic transmitted over a first network, the data traffic being associated with a client, the client confirmation system comprising:
one or more hardware processors configured to:
obtain first data usage information for a client, the first data usage information based on a plurality of data transmissions over the first network that include a client network address of the client on the first network;
determine, based on the client network address for the first network, an identifier of a second network on which the client is operating;
determine, based on the second network identifier, an address on the first network of a client authenticating service for the second network;
obtain second data usage information for the client from the authenticating service based on the address on the first network;
compare the first data usage information to the second data usage information and authenticate the client if the second data usage information generated by the client and the first data usage information agree.

2. The client confirmation system as claimed in claim 1, wherein the one or more hardware processors are further configured to rate the data traffic associated with the client according to a defined rating associated with the client.

3. The client confirmation system as claimed in claim 1, wherein the one or more hardware processors are further configured to determine at least one of:
an internet protocol address:port number identifier where the client is operating in a peer-to-client network; and
a port number identifier where the client is operating in a peer-to-peer network.

4. The client confirmation system as claimed in claim 1, further comprising:
a requesting client configured to generate a client confirmation request for the client identified by the at least one client address, and further configured to transmit the client confirmation request to a request handler to authenticate the client.

5. The client confirmation system as claimed in claim 4, wherein the one or more hardware processors are further configured to:
receive the client confirmation request from the requesting client device, the client confirmation request comprising the at least one client address;
determine a routing address associated with a user device hosting the request handler from a combination of the second network identifier and the at least one client address;
communicate with the user device hosting the request handler via a traffic router using the routing address to receive a response from the user device, the response being associated with the client; and
transmit the client confirmation response to the requesting client comprising the authenticator for confirming the client is a valid client based on the response from the user device.

6. The client confirmation system as claimed in claim 5, wherein the client comprises the request handler.

7. The client confirmation system as claimed in claim 6, wherein the one or more hardware processors are further configured to:
generate a routing request comprising the second network identifier and the client address;
transmit the routing request to a client register, wherein the client register identifies from the second network identifier and the client address a uniform resource identifier (URI) identifying the current routing address for the user device hosting the client; and
receive the URI identifying the current routing address for the user device hosting the client the current routing address for the user device.

8. The client confirmation system as claimed in claim 7, wherein the one or more hardware processors are further configured to:
generate a https query for the URI identifying the current routing address for the user device hosting the client, such that the query is received and forwarded to the user device hosting the client which responds to the https query with a https response identifying the validity of the client; and
receive the Imps response via the current routing address identifying the validity of the client.

9. The client confirmation system as claimed in claim 6, wherein the client confirmation response comprises the second data usage information generated by the client.

10. The client confirmation system as claimed in claim 6, herein the one or more hardware processors are further configured to:
receive from a user device hosting the client a request for configuration information for use of the network;
generate the at least one client address for the user device hosting the client; and
transmit to the user device the at least one client address and the second network identifier.

11. The client confirmation system as claimed in claim 10, wherein the one or more hardware processors are further configured to:
receive from the user device hosting the client a request for registration on the network, the request for registration comprising the client address for the user device hosting the client, the second network identifier and a URI identifying the current routing address for the user device hosting the client;
store the client address for the user device hosting the client, the second network identifier and a URI identifying the current routing address for the user device hosting the client such that user device hosting the client can be uniquely identified within the network by a combination of the second network identifier and the client address and the user device may be located via the URI identifying the current routing address for the user device hosting the client.

12. The client confirmation system as claimed in claim 1, wherein the one or more hardware processors are further configured to:
   receive the second data usage information from the client;
   store the second data usage information; and
   transmit the second data usage information to at least one authenticator within a requesting client for authenticating the client.

13. The client confirmation system as claimed in claim 12, wherein the one or more hardware processors are further configured to transmit the first data usage information to at least one requesting client for authenticating and the client is configured to transmit the first data usage information to at least one requesting client in response to a client confirmation request from the at least one requesting client.

14. The client confirmation system as claimed in claim 12, wherein the one or more hardware processors are further configured to transmit the first data usage information to at least one requesting client for authenticating the client.

15. The client confirmation system as claimed in claim 1, wherein the first data usage information comprises a client connection list; the client connection list comprising data flow quintuples associated with the client of {TCP or UDP, local address, local port, remote address, remote port} from a defined time.

16. The client confirmation system as claimed in claim 1, wherein the first data usage information comprises a report value, the report value comprising:
   byte-counts of a measured client data transmitted and received by the user device since whichever is later from the previous midnight (0000 UTC) or the time the client last joined the network; and
   a timestamp of the start time for the measured client data and the end time of the query period.

17. A method for identifying data traffic transmitted over a network controlled by an operator, the data traffic being associated with a client, the method comprising:
   obtaining first data usage information for a client, the first data usage information based on a plurality of data transmissions over the first network that include a client network address of the client on the first network;
   determining, based on the client network address for the first network, an identifier of a second network on which the client is operating;
   determining, based on the second network identifier, an address on the first network of a client authenticating service for the second network;
   obtaining second data usage information for the client from the authenticating service based on the address on the first network;
   comparing the first data usage information to the second data usage information; and
   authenticating the client if the second data usage information and the first data usage information agree.

18. A computer program product, the computer program product being embodied on a computer-readable storage medium and configured so as when executed on a processor of a user device within a communications architecture, to:
   obtaining first data usage information for a client, the first data usage information based on a plurality of data transmissions over the first network that include a client network address of the client on the first network;
   determining, based on the client network address for the first network, an identifier of a second network on which the client is operating;
   determining, based on the second network identifier, an address on the first network of a client authenticating service for the second network;
   obtaining second data usage information for the client from the authenticating service based on the address on the first network;
   comparing the first data usage information to the second data usage information; and
   authenticating the client if the second data usage information and the first data usage information agree.

* * * * *